Nov. 24, 1925.

W. S. NIX 1,563,221

STALK CUTTER

Filed Dec. 7, 1923

W.S.Nix, Inventor

By C.A.Snow & Co.
Attorneys

Patented Nov. 24, 1925.

1,563,221

UNITED STATES PATENT OFFICE.

WILLIAM S. NIX, OF DUNCAN, OKLAHOMA.

STALK CUTTER.

Application filed December 7, 1923. Serial No. 679,173.

*To all whom it may concern:*

Be it known that I, WILLIAM S. NIX, a citizen of the United States, residing at Duncan, in the county of Stephens and State of Oklahoma, have invented a new and useful Stalk Cutter, of which the following is a specification.

This invention relates to stalk choppers, the primary object of the invention being to provide a device of this character which may be readily and easily attached to agricultural machines, such as plows, cultivators or the like, to chop stalks or other vegetation, while the soil is being cultivated or prepared for planting.

An important object of the invention is to provide means for adjusting the chopping blades of the device with respect to the ground surface over which the same is moving to better adapt the device for use in chopping stalks of various heights.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
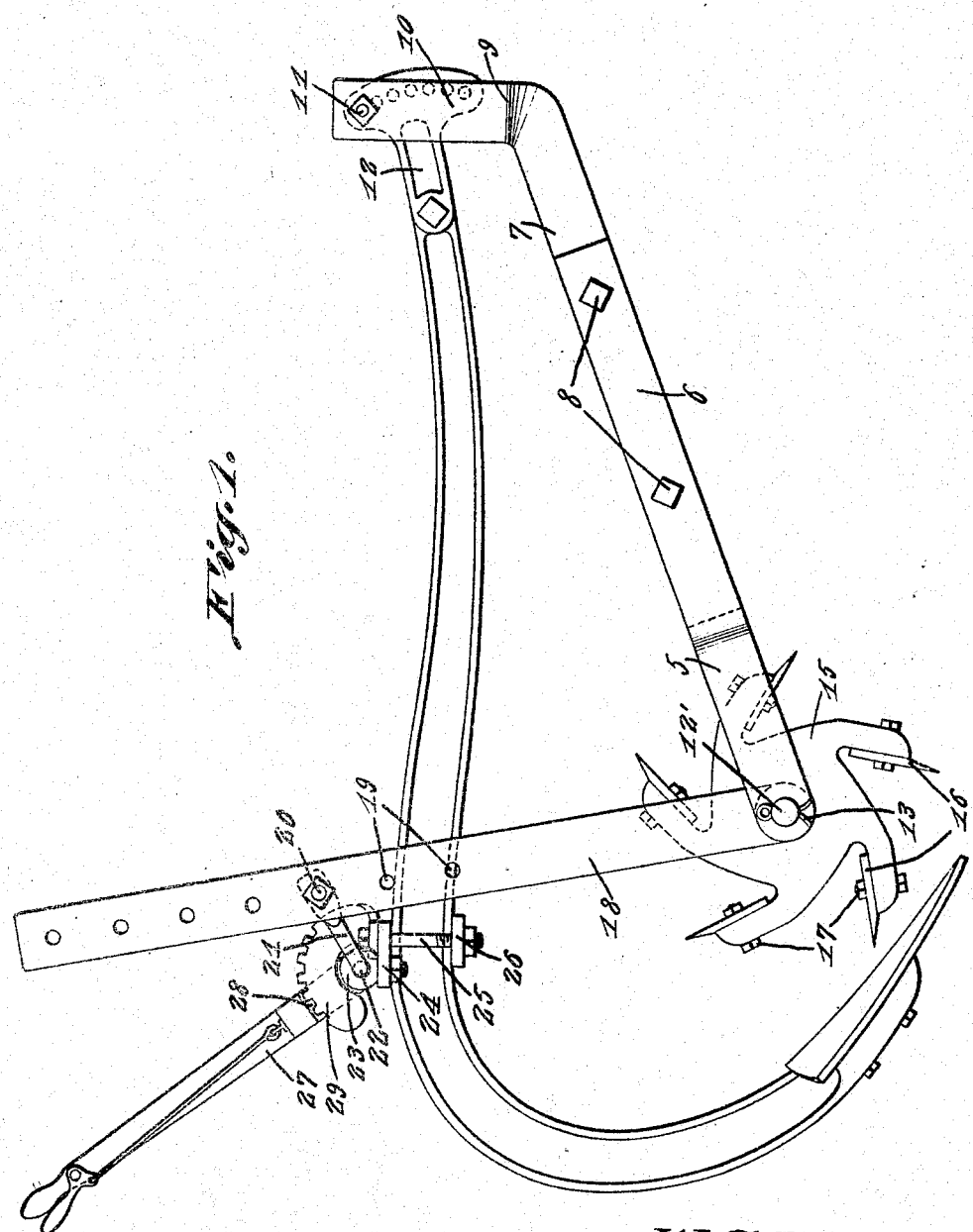
Figure 1 is a side elevational view disclosing a device constructed in accordance with the invention as attached to a plow beam.
Figure 2:
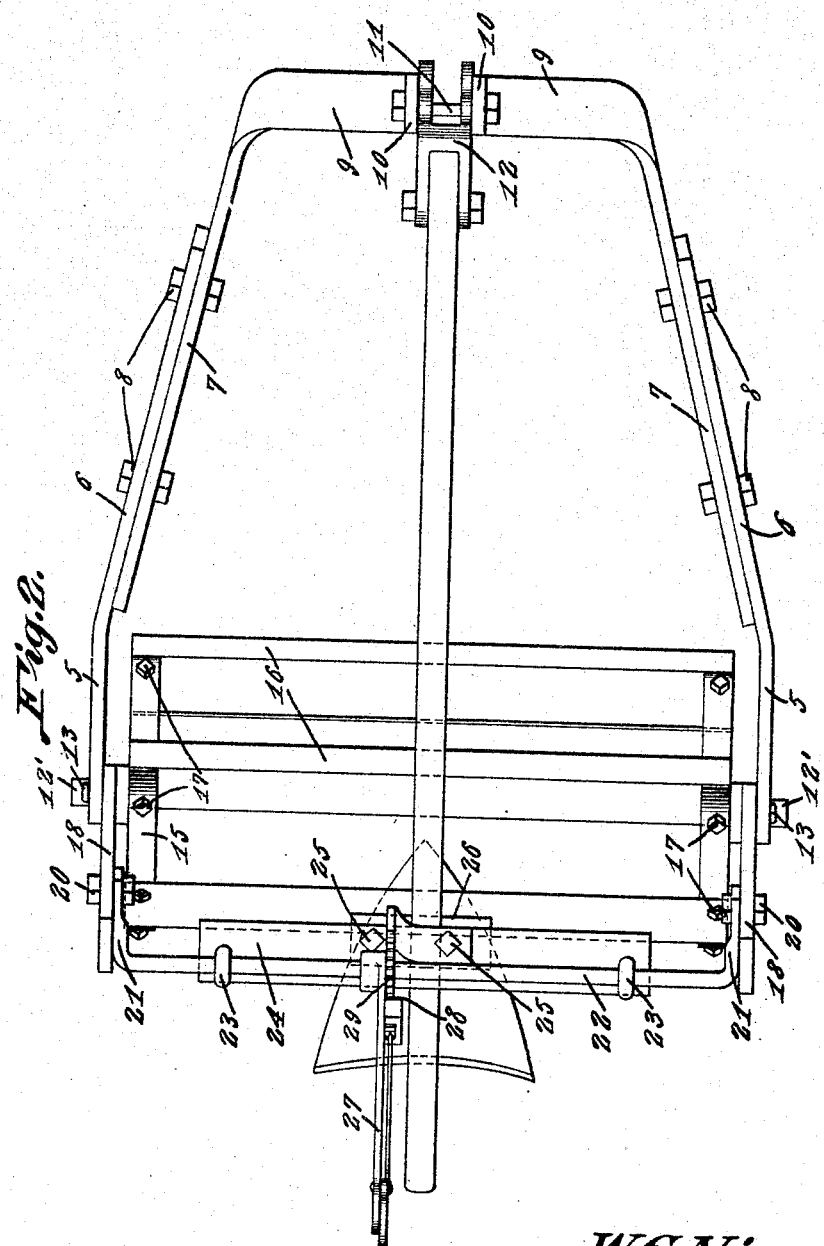
Figure 2 is a plan view of the device as attached to the plow beam.

Referring to the drawings in detail, the attachment embodies a frame including bars 5 which have their forward ends extended inwardly at 6 where they overlap the bars 7 and are bolted thereto by means of bolts 8. These bars 7 extend inwardly at their forward ends as indicated at 9 where the same extend upwardly at 10 and are connected by means of bolt 11 that is shown as passing through registering openings in the upwardly extended portions 10, the bolt 11 being also extended through openings in the usual plow beam 12, whereby the forward end of the frame may be supported.

The rear ends of the bars 5 are connected by means of the shaft 12' which has its ends extended through openings in the bars 5, where they are supplied with cotter pins 13 to hold the shaft against movement with respect to the bars 5.

The chopper embodies end spiders 15 to which the blades 16 are secured by means of bolts 17, to hold the spiders against endwise movement on the shaft 12'. Suspending bars 18 have their lower ends formed with openings to receive the shaft 12', the upper ends thereof extending to positions above the plow beam to which the device is attached.

A plurality of openings indicated at 19 are formed in the suspending bars 18, the openings being arranged in spaced relation with each other to receive the bolts 20 that also pass through openings in the right angled ends 21 of the adjusting rod 22 mounted in the eye bolts 23 that are secured to the supporting plate 24. The supporting plate 24 is secured to the plow beam or agricultural machine associated with the device by means of the bolts 25 that also extend through openings in the plate 26 engaging under the plow beam, whereby the device may be clamped in position on the plow beam.

Secured to the rod 22 is a lever 27 which may be operated to raise or lower the suspending bars 18 to adjust the blades 16 with respect to the ground surface over which the device is moving.

Associated with the lever 27 is the usual locking pin 28 that moves within the teeth of the segment 29 to lock the lever in various positions of adjustment and hold the suspending bars 18 in their positions of adjustment.

From the foregoing it will be obvious that due to this construction the lever 27 may be operated to raise or lower the suspending bars 18 to the end that the blades 16 may be adjusted to cause them to dig deep or shallow, at the will of the operator. It is to be understood that the device may be employed in connection with the usual agricultural machine regardless of the means for propelling the same.

I claim:—

In combination with a shovel plow and the stock thereof, a frame including side members adjustably connected with the plow stock, suspending bars pivotally connected with the side bars, a supporting plate adapted to be clamped on the plow stock, eye bolts on the supporting plate, an adjusting rod having right angled extremities mounted within the eye bolts, the right angled extremities being connected with the suspending bars to raise and lower the suspending bars, a rotary chopping member carried at the lower ends of the suspending bars, and means for operating the rod to raise or lower the suspending bars and chopping member.

In testimony that I claim the foregoing as my own, I have hereto affixed my signature.

WILLIAM S. NIX.